S. L. DENNEY.
Horse Rake.
No. 2,353. Reissued Sept. 11, 1866.
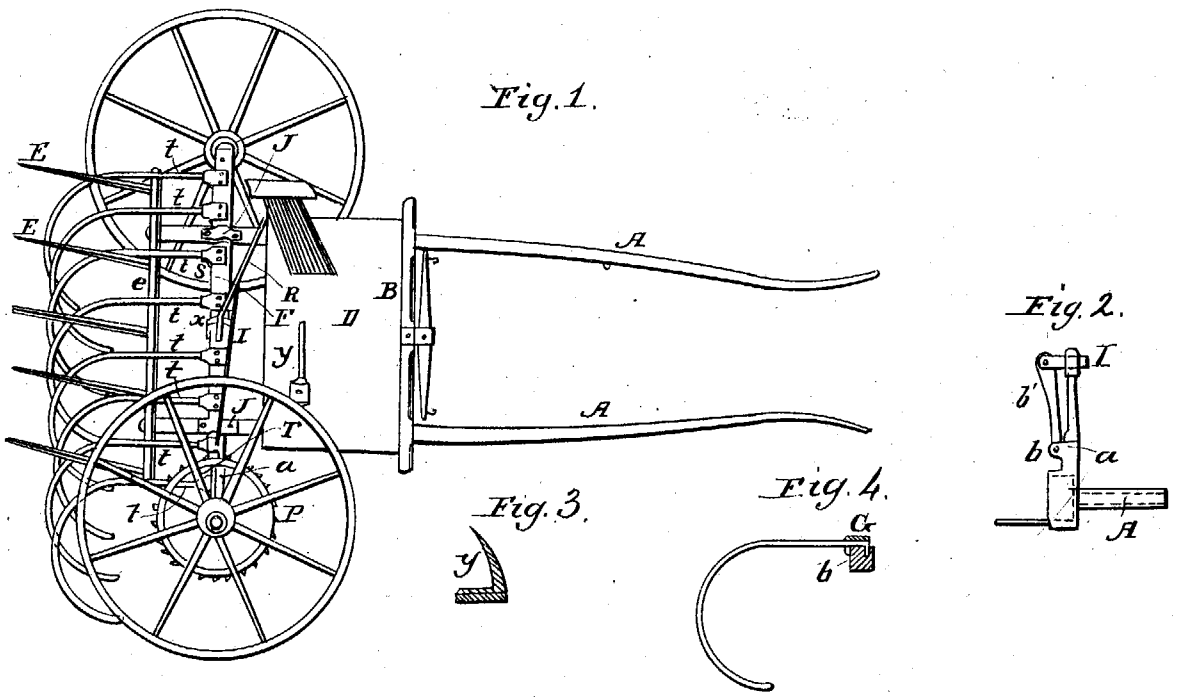
Witnesses:
Sarah L. Denney
H. Denney
Inventor:
S. L. Denney
N. PETERS, Photo-Lithographer, Washington, D. C.

UNITED STATES PATENT OFFICE.

SAMUEL L. DENNEY, OF CHRISTIANA, PENNSYLVANIA.

IMPROVEMENT IN HORSE-RAKES.

Specification forming part of Letters Patent No. 39,383, dated August 4, 1863; antedated April 2, 1863; Reissue No. 2,353, dated September 11, 1866.

*To all whom it may concern:*

Be it known that I, SAMUEL L. DENNEY, of Christiana, in the county of Lancaster and State of Pennsylvania, have invented a new and useful Improvement in Horse-Rakes; and I do hereby declare that the following is a full, clear, and exact description of the construction and operation of the same, reference being had to the annexed drawings, making part of this specification, in which—

Figure 1 is a view in perspective; Fig. 2, a side elevation of the unloading device; Fig. 3, a view of the releasing-stand, and Fig. 4 the tooth.

This invention consists in a mechanism for effecting or severing at will a rigid connection between the rake-head, to which are attached the teeth of a horse-rake, and one of the wheels of the same, for the purpose hereinafter described.

A A represent thills for the attachment of the horse, which pass under and are connected with the axle F by means of the hangers J. Any other suitable means of connection may be made use of. The thills are suspended in this way in order that they may run clear of the axle and project beyond it sufficiently to afford support to the transverse bar *c* upon their rear ends, to which are attached the clearing-fingers E. The connection by means of the hangers J is sufficiently loose to admit of such oscillation as may be desirable.

B represents the draft-bar to which the whiffletree is attached.

D represents a platform secured to the thills A, for the purpose of affording foundation for the driver's seat and footing for the driver, and also support for the curved stand Y.

E represents fingers, of any convenient number, firmly attached to the bar *c* and projecting therefrom to the rear a little farther than the teeth *t* of the rake. These fingers should be so located that the teeth *t* may pass clear of them on being raised past them.

The teeth *t* are attached to the axle F, which thus forms also the rake-head. The connection is effected by means of tangs *t'* on the ends of the rake-teeth, at right angles to the straight portion thereof, the tangs being inserted in the axle in the direction of its depth. The connection is further strengthened by means of guards *g*, of iron or other suitable metal, cast or formed in any other desired manner.

A longitudinal groove runs completely through each guard for the reception of the ends of the teeth *t*. One part of the guard rests upon the upper side of the axle F, and in the under side of this part is the aforesaid groove, of a capacity sufficient to receive a portion of the confined part of the tooth, the other portion of which rests in a corresponding depression in the axle. The other part of the guard bears, by means of a lip, *l*, on its bottom, against the inner side of the axle F.

The upper surface of the guard, just above the lip *l*, is beveled off sufficiently to lay bare the groove. This is done that the groove may be cast in the guard, whereby the necessity of drilling a receptacle therein is avoided. As the groove is cast, any desired shape may be given it, whereas there are some shapes which could not well be given it by a drill.

The guard is put in place by being slipped on the tooth over its lower end, and thus brought up along the tooth till the lip *l* meets the axle.

R represents a lever, pivoted at its lower end about at the middle of the axle, so as to have a motion in the direction of its length. The lever should be large enough to enable the driver to operate it easily from his seat.

A' represents a metallic hollow casing, which is driven upon the end of the axle F, serving the double purpose of preventing the axle from cracking and of supporting the arm *a*, which is cast in one piece with it.

The arm *a* is provided with lugs *b*, in which is pivoted an arm, *b'*, jointed at its upper end to the rod I, which is connected with the before-mentioned lever R.

The arm *a* is provided with a slot near its upper end, through which plays the rod I.

P is a serrated circular rim attached to one of the carriage wheels concentric with its tire, and of a diameter such that the point on its periphery directly above its center is nearly on the same level with the under side of the rod I.

Y represents a curved standard with a flange on its base, by means of which it is secured to the platform D in such a position that the junction between the standard and flange is about opposite the foot of the lever R.

From this description it will be perceived that when it is desired to clear the rake-teeth of the hay or other accumulated material, it is only necessary for the driver to move the lever R to the right, or toward the serrated rim P. This movement forces the rod I in the same direction through the slot in the upright *a*, and causes it to engage with one of the teeth in the serrated rim. When this is done the axle F is rigidly connected with the carriage-wheel, and of course must partake of its rotary motion. The rake-teeth, being also rigidly connected with the axle, necessarily revolve with it. They are thus raised from the ground with their load. As they are obliged, however, to pass between the fingers E, the load is caught by the latter, and, as soon as the teeth have passed beyond it, falls to the ground in a compact mass and is left behind. The teeth continue their revolution until the lever R, striking the curved standard Y, is returned by it to its original position, withdrawing the rod I from its engagement with the serrated rim P. The connection between the wheel and axle is thus broken and the teeth fall once more to the ground.

The number of serrations in the rim P may be sufficiently numerous to enable the rod I to engage immediately with one of them, so as to effect the dropping of the load at any desired point.

It is evident that the force required to discharge the load will be in proportion to the length of the arm through which the force is applied. By effecting the rigid connection between the wheel and the axle at a point above the hub less force is required to do the same work than if the connection were effected at the hub by means of a shifting clutch.

A spring, *x*, bears against the lever R and prevents its moving toward the serrated rim, except when forced in that direction by the operator.

I am aware of the existence of the rejected invention of G. S. Kinsey, which shows a clearing arrangement attached, like mine, to a transverse bar connecting the hinder ends of thills suspended from and projecting in rear of axle, but differing from mine in being a broad bar with slots through which the rake-teeth pass in order to be cleared, instead of being a system of fingers between which the rake-teeth pass for the same purpose, the slotted bar being of course more bulky, weighty, and expensive of construction than the system of fingers.

I therefore do not claim, broadly, the idea of suspending the thills from the axle and attaching a clearer to their projecting rear ends; but What I do claim as new, and desire to secure by Letters Patent, is—

1. The bar *c*, connecting the ends of the thills A, which are suspended from the axle F, in combination with the clearing-fingers E, all arranged and operating in the manner described.

2. The cast hollow casing A′, in combination with the arms *a* and *b*′, as and for the purpose set forth.

3. The guard *g*, constructed and used in the manner described.

4. The guard *g*, in combination with tang *t*′, as and for the purpose set forth.

5. The serrated rim P, or equivalent, secured to the spokes or hub of the rake-wheel, in combination with the arm *a*, attached to the rake axle or spindle, the arm *b*′, the rod I, the lever R, the spring *x*, and the curved standard Y, all arranged in the manner described.

S. L. DENNEY.

Witnesses:
GEO. E. BROWN,
H. W. BEADLE.